(12) United States Patent
Kobayashi et al.

(10) Patent No.: US 11,904,908 B2
(45) Date of Patent: Feb. 20, 2024

(54) VEHICLE CONTROL DEVICE, VEHICLE SYSTEM, VEHICLE CONTROL METHOD, AND PROGRAM

(71) Applicant: HONDA MOTOR CO., LTD., Tokyo (JP)

(72) Inventors: Takuma Kobayashi, Wako (JP); Yoshifumi Nakamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/923,637

(22) PCT Filed: Dec. 28, 2020

(86) PCT No.: PCT/JP2020/049144
§ 371 (c)(1),
(2) Date: Nov. 7, 2022

(87) PCT Pub. No.: WO2022/144977
PCT Pub. Date: Jul. 7, 2022

(65) Prior Publication Data
US 2023/0311951 A1 Oct. 5, 2023

(51) Int. Cl.
*B60W 60/00* (2020.01)
*B60S 1/08* (2006.01)

(52) U.S. Cl.
CPC ....... *B60W 60/0053* (2020.02); *B60S 1/0818* (2013.01); *B60W 2510/30* (2013.01); *B60W 2555/20* (2020.02); *B60W 2710/30* (2013.01)

(58) Field of Classification Search
CPC ......... B60W 60/0053; B60W 2510/30; B60W 2555/20; B60W 2710/30; B60W 50/82;
(Continued)

(56) References Cited

U.S. PATENT DOCUMENTS

2004/0080751 A1* 4/2004 Kokuryo ............... B60S 1/0818
356/445
2005/0165533 A1 7/2005 Terada
(Continued)

FOREIGN PATENT DOCUMENTS

CN      111727145      9/2020
CN      111752266      10/2020
(Continued)

OTHER PUBLICATIONS

Espacenet English translation of DE-10223210-A1 Description (Year: 2003).*
(Continued)

*Primary Examiner* — Brian P Sweeney
*Assistant Examiner* — Andrew Sang Kim
(74) *Attorney, Agent, or Firm* — Amin, Turocy & Watson, LLP

(57) ABSTRACT

A vehicle control device includes a driving controller configured to control one or both of steering and acceleration or deceleration of a vehicle; and a mode determiner configured to determine a driving mode of the vehicle to be one of a plurality of driving modes including a first driving mode and a second driving mod, in which the second driving mode is a driving mode in which a task imposed on a driver of the vehicle is lighter than that of the first driving mode and one or both of the steering and the acceleration or deceleration are controlled by the driving controller, and to change the driving mode to the first driving mode on the basis of an operating state of a wiper mounted in the vehicle when the driving controller controls the vehicle in the second driving mode.

14 Claims, 6 Drawing Sheets

(58) Field of Classification Search
CPC .. B60W 60/0061; B60W 50/08; B60S 1/0818
See application file for complete search history.

(56) References Cited

U.S. PATENT DOCUMENTS

| | | | |
|---|---|---|---|
| 2014/0156134 A1* | 6/2014 | Cullinane | B60R 16/023 701/23 |
| 2015/0073621 A1* | 3/2015 | Kida | B60W 10/06 701/1 |
| 2018/0059671 A1* | 3/2018 | Sogen | G01C 21/3667 |
| 2020/0307595 A1 | 10/2020 | Kato et al. | |
| 2020/0398868 A1 | 12/2020 | Horii et al. | |

FOREIGN PATENT DOCUMENTS

| | | | | |
|---|---|---|---|---|
| DE | 10223210 A1 * | 12/2003 | | G08B 21/06 |
| DE | 602004005151 | 11/2007 | | |
| DE | 102019101515 A1 * | 7/2020 | | |
| JP | 2000-293782 | 10/2000 | | |
| JP | 2015-054604 | 3/2015 | | |
| JP | 2016-095831 | 5/2016 | | |
| JP | 2017-102556 | 6/2017 | | |
| WO | WO-2021128028 A1 * | 7/2021 | | B60W 30/09 |

OTHER PUBLICATIONS

Espacenet English translation of WO-2021128028-A1 Description (Year: 2021).*
Espacenet English translation of DE-102019101515-A1 Description (Year: 2020).*
International Search Report and Written Opinion for International Application No. PCT/JP2020/049144 dated Feb. 16, 2021, 9 pages.
Japanese Decision to Grant a Patent for Japaneses Patent Application No. 2021-576283 dated Mar. 24, 2022.
Chinese Office Action for Chinese Patent Application No. 202080100108.1 dated Feb. 28, 2023.
German Office Action for German Patent Application No. 112020007069.7 dated Aug. 20, 2023.

* cited by examiner

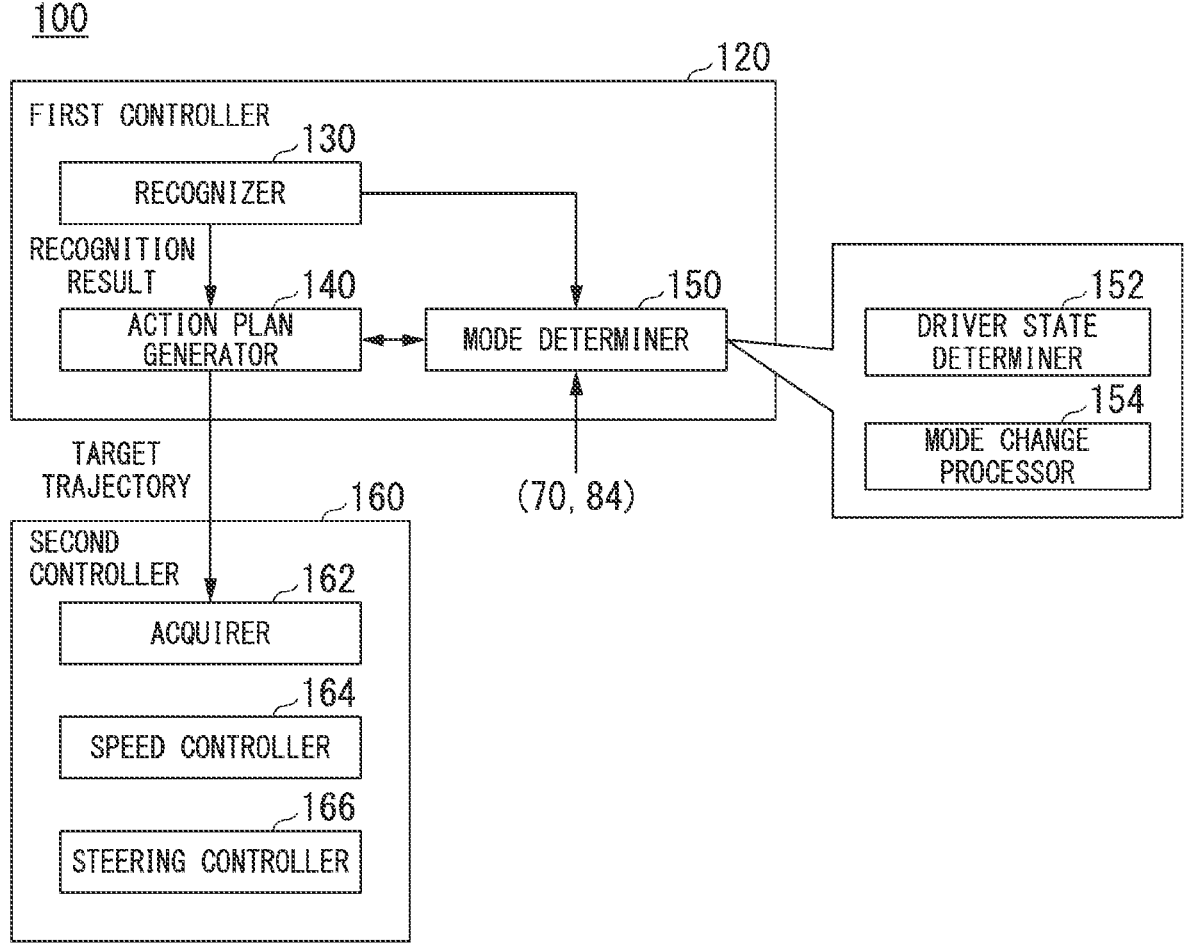

FIG. 5

| CONDITION | OPERATION MODE | SPEED | CONTINUANCE TIME |
|---|---|---|---|
| FIRST CONDITION | AUTO WIPER | HIGH SPEED | X SECONDS |
| SECOND CONDITION | MANUAL WIPER | HIGH SPEED | Y SECONDS |

FIG. 7

| CONDITION | OPERATION MODE | SPEED | CONTINUANCE TIME | NUMBER OF TIMES PER UNIT TIME |
|---|---|---|---|---|
| FIRST CONDITION | AUTO MODE | MEDIUM SPEED | XX SECONDS | $\alpha$ |
| SECOND CONDITION | MANUAL MODE | MEDIUM SPEED | YY SECONDS | $\beta$ |

VEHICLE CONTROL DEVICE, VEHICLE SYSTEM, VEHICLE CONTROL METHOD, AND PROGRAM

TECHNICAL FIELD

The present invention relates to a vehicle control device, a vehicle system, a vehicle control method, and a program.

BACKGROUND ART

Conventionally, a driving support system that identifies a decreasing region where the detection capability of a sensor decreases on the basis of information obtained from a plurality of vehicles via communication and stops automated driving when a vehicle is located in the decreasing region is disclosed (Patent Document 1).

CITATION LIST

Patent Literature

[Patent Literature 1]
Japanese Unexamined Patent Application, First Publication No. 2016-95831

SUMMARY OF INVENTION

Technical Problem

In the conventional technologies, it has been not possible to control vehicles appropriately in some cases.

The present invention has been made in view of such circumstances and an object thereof is to provide a vehicle control device, a vehicle system, a vehicle control method, and a program that can control vehicles more appropriately.

Solution to Problem

A vehicle control device according to the present invention has adopted the following configuration.

(1): A vehicle control device according to one aspect of the present invention includes a driving controller configured to control one or both of steering and acceleration or deceleration of a vehicle, and a mode determiner configured to determine a driving mode of the vehicle to be one of a plurality of driving modes including a first driving mode and a second driving mod, in which the second driving mode is a driving mode in which a task imposed on a driver of the vehicle is lighter than that of the first driving mode and one or both of the steering and the acceleration or deceleration are controlled by the driving controller, and to change the driving mode to the first driving mode on the basis of an operating state of a wiper mounted in the vehicle when the driving controller controls the vehicle in the second driving mode.

(2): In the aspect of (1) described above, the second driving mode is a mode in which a task of monitoring surroundings of the vehicle and a task of gripping a steering wheel are not imposed on the driver, and the first driving mode is a mode in which the vehicle is controlled by a driving operation of the driver.

(3): In the aspect of (1) or (2) described above, the mode determiner changes the driving mode to the first driving mode when an operating state of the wiper has satisfied a predetermined condition that there is estimated to be a predetermined degree or more of rainfall.

(4): In the aspect of (1) or (2) described above, the mode determiner changes the driving mode to the first driving mode when the wiper is operating at a speed equal to or higher than a first threshold value for a first time.

(5): In the aspect of any one of (1) to (4) described above, the vehicle control device further includes a wiper controller configured to control an operating state of the wiper on the basis of rainfall information acquired from a rain sensor that detects an amount of rainfall outside the vehicle or setting information acquired from a switch that is operated by the driver and receives a setting of the operating state of the wiper, in which the mode determiner determines whether to maintain the second driving mode or to change the driving mode to the first driving mode on the basis of an operating state of the wiper according to control of the wiper controller.

(6): In the aspect of any one of (1) to (5) described above, the vehicle control device further includes a wiper controller configured to control the wiper in the first mode controlling the operating state of the wiper on the basis of rainfall information acquired from a rain sensor that detects the amount of rainfall outside the vehicle, or in the second mode controlling the operating state of the wiper on the basis of setting information acquired from a switch that is operated by the driver and receives the setting of the operating state of the wiper, in which the mode determiner changes the driving mode to the first driving mode when the wiper controller controls the operating state of the wiper in the first mode and the operating state of the wiper has satisfied a first condition, and changes the driving mode to the first driving mode when the wiper controller controls the operating state of the wiper in the second mode and the operating state of the wiper has satisfied a second condition that is different from the first condition.

(7): In the aspect of (6) described above, the second condition is a condition of which a determination criterion is looser than that of the first condition.

(8): In the aspect of (7) described above, the first condition is that the wiper operates at a speed equal to or higher than a first speed for a second time, and the second condition is that the wiper operates at a speed equal to or higher than the first speed for a third time shorter than the second time.

(9): In the aspect of any one of (1) to (8) described above, the vehicle control device further includes a wiper controller configured to control an operating state of the wiper, in which the mode determiner changes the driving mode to the first driving mode when the wiper does not operate even if the wiper controller has given an instruction to cause the wiper to operate.

(10): In the aspect of any one of (1) to (9) described above, the mode determiner prohibits changing of the driving mode to the second driving mode on the basis of an operating state of a wiper mounted in the vehicle when the driving controller controls the vehicle in the first driving mode.

(11): In the aspect of any one of (1) to (10) described above, the mode determiner prohibits changing of the driving mode to the second driving mode when the operating state of the wiper has satisfied a predetermined condition that there is estimated to be a predetermined degree or more of rainfall, or prohibits changing of the driving mode to the second driving mode when the wiper is operating at a speed equal to or higher than a predetermined degree for a predetermined period of time.

(12): In the aspect of any one of (1) to (11) described above, the vehicle control device further includes a recognizer configured to recognize a surrounding situation of the vehicle by using at least an image captured by a camera that captures an image of an outside of the vehicle mounted in a compartment of the vehicle, in which, when automated driving in which one of both of the steering and the acceleration or deceleration are automatically controlled on the basis of a surrounding situation recognized by the recognizer is performed and performance of the recognizer to recognize surroundings of the vehicle deteriorates by a predetermined degree or more, the driving controller stops the automated driving.

(13): A vehicle system according to still another aspect of the present invention includes a driving controller configured to control one or both of steering and acceleration or deceleration of a vehicle, a mode determiner configured to determine a driving mode of the vehicle to be one of a plurality of driving modes including a first driving mode and a second driving mode, in which the second driving mode is a driving mode in which a task imposed on a driver of the vehicle is lighter than that of the first driving mode and one or both of the steering and the acceleration or deceleration are controlled by the driving controller, and to change the driving mode to the first driving mode on the basis of an operating state of a wiper mounted in the vehicle when the driving controller controls the vehicle in the second driving mode, and a wiper controller configured to control the wiper in the first mode controlling the operating state of the wiper on the basis of rainfall information acquired from a rain sensor that detects the amount of rainfall outside the vehicle, or in the second mode controlling the operating state of the wiper on the basis of setting information acquired from a switch that is operated by the driver and receives the setting of the operating state of the wiper, in which the mode determiner changes the driving mode to the first driving mode when the wiper controller controls an operating state of the wiper in the first mode and the operating state of the wiper has satisfied a first condition, and the mode determiner changes the driving mode to the first driving mode when the wiper controller controls an operating state of the wiper in the second mode and the operating state of the wiper has satisfied a second condition that is different from the first condition.

(14): A vehicle control method according to still another aspect of the present invention includes, by a computer mounted in a vehicle, controlling one or both of steering and acceleration or deceleration of a vehicle, determining a driving mode of the vehicle to be one of a plurality of driving modes including a first driving mode and a second driving mode, in which the second driving mode is a driving mode in which a task imposed on a driver of the vehicle is lighter than that of the first driving mode and a driving mode in which one or both of the steering and the acceleration or deceleration are controlled without depending on an operation of the driver, and changing the driving mode to the first driving mode on the basis of an operating state of a wiper mounted in the vehicle when the driving controller controls the vehicle in the second driving mode.

(15): A program according to still another aspect of the present invention causes a computer mounted in a vehicle to execute controlling one or both of steering and acceleration or deceleration of the vehicle, determining a driving mode of the vehicle to be one of a plurality of driving modes including a first driving mode and a second driving mode, in which the second driving mode is a driving mode in which a task imposed on a driver of the vehicle is lighter than that of the first driving mode and a driving mode in which one or both of the steering and the acceleration or deceleration are controlled without depending on an operation of the driver, and changing the driving mode to the first driving mode on the basis of an operating state of a wiper mounted in the vehicle when the driving controller controls the vehicle in the second driving mode.

Advantageous Effects of Invention

According to the aspects of (1) to (15) described above, it is possible to control vehicles more appropriately.

BRIEF DESCRIPTION OF DRAWINGS

FIG. 2 is a functional configuration diagram of a first controller and a second controller.

FIG. 3 is a diagram which shows an example of a corresponding relationship between a driving mode, a control state of a host vehicle, and a task.

FIG. 5 is a diagram for describing a first condition and a second condition.

FIG. 7 is a diagram for describing another example of the first condition or the second condition.

DESCRIPTION OF EMBODIMENTS

Figure 1:
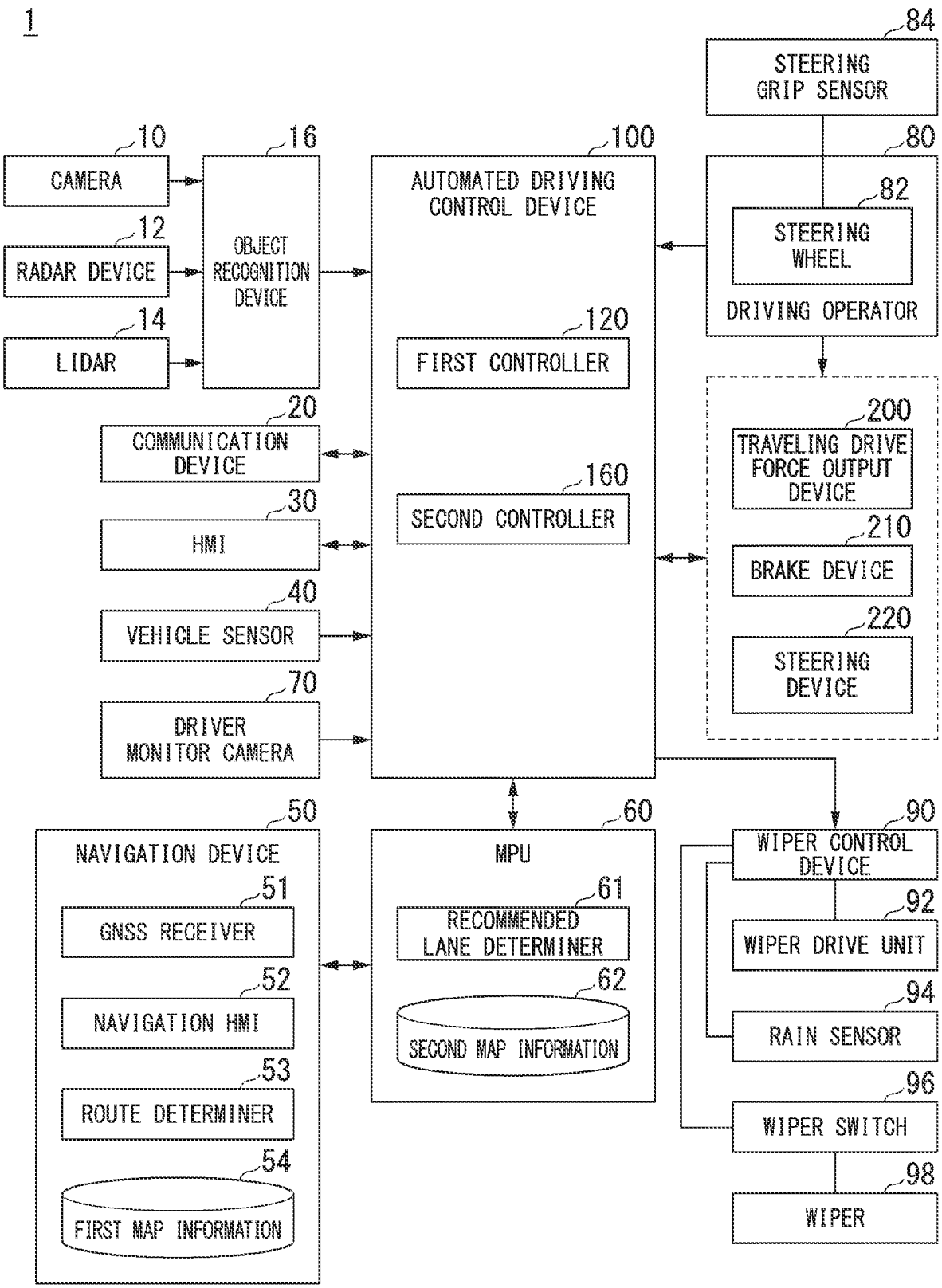
FIG. 1 is a configuration diagram of a vehicle system using a vehicle control device according to an embodiment.

Hereinafter, embodiments of a vehicle control device, a vehicle system, a vehicle control method, and a program of the present invention will be described with reference to the drawing.

[Overall Configuration]

FIG. 1 is a configuration diagram of a vehicle system 1 using a vehicle control device according to an embodiment. A vehicle in which the vehicle system 1 is mounted is, for example, a vehicle such as a two-wheeled vehicle, a three-wheeled vehicle, or a four-wheeled vehicle, and a drive source thereof is an internal combustion engine such as a diesel engine or a gasoline engine, an electric motor, or a combination of these. The electric motor operates by using electric power generated by a generator connected to the internal combustion engine or discharge power of secondary batteries or fuel cells.

The vehicle system 1 includes, for example, a camera 10, a radar device 12, a light detection and ranging (LIDAR) 14, an object recognition device 16, a communication device 20, a human machine interface (HMI) 30, and a vehicle sensor 40, a navigation device 50, a map positioning unit (MPU) 60, a driving operator 80, a wiper control device 90, a wiper drive unit 92, a rain sensor 94, a wiper switch 96, a wiper 98, an automated driving control device 100, a traveling drive force output device 200, a brake device 210, and a steering device 220. These devices and apparatuses are connected to each other by a multiplex communication line such as a controller area network (CAN) communication line, a serial communication line, a wireless communication network, or the like. The configuration shown in FIG. 1 is merely an example, and a part of the configuration may be omitted or another configuration may be added.

The camera 10 is a digital camera that uses a solid-state image sensor such as a charge coupled device (CCD) or a complementary metal oxide semiconductor (CMOS). The camera 10 is attached to an arbitrary place in a vehicle in which the vehicle system 1 is mounted (hereinafter, referred to as a host vehicle M). When an image of the front is captured, the camera 10 is attached to an upper part of the front windshield, a back surface of the windshield rear-view mirror, and the like. The camera 10 periodically and repeatedly captures, for example, an image of a periphery of the host vehicle M. The camera 10 may be a stereo camera.

The radar device 12 radiates radio waves such as millimeter waves to the vicinity of the host vehicle M, and detects radio waves (reflected waves) reflected by an object to detect at least the position (distance and orientation) of the object. The radar device 12 is attached to an arbitrary place of the host vehicle M. The radar device 12 may detect the position and speed of the object by a frequency modulated continuous wave (FM-CW) method.

The LIDAR 14 irradiates the vicinity of the host vehicle M with light (or an electromagnetic wave having a wavelength close to that of light) and measures scattered light. The LIDAR 14 detects a distance to a target on the basis of a time from light emission to light reception. The emitted light is, for example, a pulsed laser beam. The LIDAR 14 is attached to arbitrary place of the host vehicle M.

The object recognition device 16 performs sensor fusion processing on results of detection by some or all of the camera 10, the radar device 12, and the LIDAR 14, and recognizes the position, type, speed, and the like of the object. The object recognition device 16 outputs a result of the recognition to the automated driving control device 100. The object recognition device 16 may output the results of the detection by the camera 10, the radar device 12, and the LIDAR 14 to the automated driving control device 100 as they are. The object recognition device 16 may be omitted from the vehicle system 1.

The communication device 20 communicates with other vehicles existing in the vicinity of the host vehicle M by using, for example, a cellular network, a Wi-Fi network, Bluetooth (registered trademark), dedicated short range communication (DSRC), or communicates with various server devices via a wireless base station.

The HMI 30 presents various types of information to the occupant of the host vehicle M and receives an input operation from the occupant. The HMI 30 includes various display devices, speakers, buzzers, touch panels, switches, keys and the like.

The vehicle sensor 40 includes a vehicle speed sensor that detects a speed of the host vehicle M, an acceleration sensor that detects the acceleration, a yaw rate sensor that detects the angle speed around the vertical axis, an azimuth sensor that detects a direction of the host vehicle M, and the like.

The navigation device 50 includes, for example, a global navigation satellite system (GNSS) receiver 51, a navigation HMI 52, and a route determiner 53. The navigation device 50 holds first map information 54 in a storage device such as a hard disk drive (HDD) or a flash memory. The GNSS receiver 51 identifies the position of the host vehicle M based on a signal received from a GNSS satellite. The position of the host vehicle M may be identified or complemented by an inertial navigation system (INS) using an output of the vehicle sensor 40. The navigation HMI 52 includes a display device, a speaker, a touch panel, a key, and the like. The navigation HMI 52 may be partially or entirely shared with the HMI 30 described above. The route determiner 53 determines, for example, a route from the position of the host vehicle M (or an arbitrary position to be input) identified by the GNSS receiver 51 to a destination to be input by the occupant using the navigation HMI 52 (hereinafter, a route on a map) with reference to the first map information 54. The first map information 54 is, for example, information in which a road shape is expressed by a link indicating a road and nodes connected by a link. The first map information 54 may include a road curvature, point of interest (POI) information, and the like. A route on a map is output to the MPU 60. The navigation device 50 may perform route guidance using the navigation HMI 52 based on the route on a map. The navigation device 50 may be realized by, for example, a function of a terminal device such as a smartphone or a tablet terminal owned by the occupant. The navigation device 50 may transmit a current position and a destination to a navigation server via the communication device 20 and acquire a route equivalent to the route on a map from the navigation server.

The MPU 60 includes, for example, a recommended lane determiner 61, and holds second map information 62 in a storage device such as an HDD or a flash memory. The recommended lane determiner 61 divides the route on a map provided from the navigation device 50 into a plurality of blocks (for example, divides every 100 [m] in a vehicle traveling direction), and determines a recommended lane for each block with reference to the second map information 62. The recommended lane determiner 61 determines which numbered lane from the left to drive. When a branch place is present on the route on a map, the recommended lane determiner 61 determines a recommended lane so that the host vehicle M can travel on a reasonable route to proceed to the branch destination.

The second map information 62 is map information with higher accuracy than the first map information 54. In addition, the second map information 62 includes, for example, information on a center of a lane, information on a boundary of the lane, and the like. The second map information 62 may include road information, traffic regulation information, address information (addresses/zip codes), facility information, telephone number information, information on a prohibited section in which a mode A or a mode B to be described below is prohibited, and the like. The second map information 62 may be updated at any time by the communication device 20 communicating with another device.

The driver monitor camera 70 is, for example, a digital camera that uses a solid-state image sensor such as a CCD or CMOS. The driver monitor camera 70 is attached to an arbitrary place in the host vehicle M at a position and in an orientation in which the head of an occupant (hereinafter referred to as a driver) seated in the driver's seat of the host vehicle M can be imaged from a front (in a direction in which the face is imaged). For example, the driver monitor camera 70 is attached to an upper part of a display device provided in a central portion of an instrument panel of the host vehicle M.

The driving operator 80 includes, for example, in addition to the steering wheel 82, an accelerator pedal, a brake pedal, a shift lever, a steering wheel, an odd-shaped steering wheel, a joystick, and other operators. The driving operator 80 has a sensor attached thereto that detects the amount of operation or the presence or absence of an operation, and a result of detection is output to the automated driving control device 100, or some or all of the traveling drive force output device 200, the brake device 210, and the steering device 220. The steering wheel 82 is an example of an "operator that receives a steering operation by a driver." The operator does not necessarily have to be annular, and may be in the form of a steering device of an alternate form, a joystick, a button, or the like. A steering grip sensor 84 is attached to the steering wheel 82. The steering grip sensor 84 is realized by a capacitance sensor or the like, and outputs a signal that can detect whether the driver is gripping the steering wheel 82 (meaning that the driver is in contact with the steering wheel 82 while applying force) to the automated driving control device 100.

The wiper control device 90, for example, transmits an instruction regarding an operating state of the wiper 98 to the wiper drive unit 92 and operates the wiper drive unit 92. The operating state is, for example, a degree of operation of the wiper 98 per unit time. For example, the wiper control device 90 controls, for example, the degree of operation of the wiper 98 per unit time. The degree of operation per unit time is, for example, the number of times one routine of processing (a reciprocating operation) in which the wiper 98 returns from an operation start point to the operation start point via a turnaround point is executed in the unit time, a speed at which the wiper 98 moves in the reciprocating operation, or a combination of these. As the intermittent time for the operation of the wiper 98 is shortened, a movement speed becomes faster, or a movement amount (momentum) of the wiper 98 increases, the degree of operation increases. This means that the operation speed of the wiper 98 becomes faster as the degree of operation increases.

The wiper control device 90 controls the wiper in an auto wiper mode or a manual mode. When the auto wiper mode and the manual mode are not distinguished, they are called an operation mode in some cases. When the auto wiper mode is set, the wiper control device 90 controls the operating state of the wiper 98 on the basis of the rainfall information acquired from the rain sensor 94. For example, the auto wiper mode is set when the occupant operates the wiper switch 96. The rainfall information is information indicating how much it is raining. The wiper control device 90, for example, increases the speed of operation of the wiper 98 as the amount of rainfall increases. The wiper control device 90 operates the wiper at, for example, "high speed," "medium speed," or "low speed" depending on the amount of rainfall. In order of "high speed," "medium speed," and "low speed," for example, the speed of operation is higher. The speed of the wiper 98 is not limited to three stages, but may be set in multiple stages such as two stages or four stages, and the speed may also be controlled linearly or according to the amount of operation on the wiper switch 96.

When the manual mode is set, the wiper control device 90 controls the operating state of the wiper 98 on the basis of the setting information acquired from the wiper switch 96. For example, the occupant operates the wiper switch 96, and thereby the operating state of the wiper 98 is set to the manual mode.

For example, the operating speed of the wiper 98 is set to "high speed," "medium speed," or "low speed." In order of "high speed," "medium speed," and "low speed," for example, the operation speed of the wiper 98 is higher. Each of "high speed," "medium speed," and "low speed" in the manual mode may be the same speed as or a different speed from "high speed," "medium speed," and "low speed" in the auto mode.

The wiper drive unit 92 operates the wiper 98 on the basis of an instruction of the wiper control device 90. For example, the wiper drive unit 92 operates the wiper 98 in the operating state instructed by the wiper control device 90.

The rain sensor 94 detects the amount of rainfall outside the host vehicle M. The rain sensor 94 is provided, for example, inside a compartment of the front window, emits light toward the front window, receives light reflected by the front window or raindrops, and detects the amount of rainfall outside the vehicle on the basis of a result of the light reception. In addition, the rain sensor 94 may analyze an image captured by a camera provided in the host vehicle M and detect the amount of rainfall on the basis of a result of the analysis, or may detect the amount of rainfall on the basis of a capacitance that changes when water droplets adhere between a pair of electrodes.

The wiper switch 96 is operated by the driver and receives settings for the operation mode of the wiper 98 and the operating state of the wiper 98. For example, the wiper switch 96 receives an operation of turning on the wiper 98 and a speed of the operation of the wiper 98 as described above.

The wiper 98 is, for example, a wiper that removes raindrops from the front window mounted on the host vehicle M. The wiper 98 may include a wiper that removes raindrops from the rear window.

The automated driving control device 100 includes, for example, a first controller 120, and a second controller 160. The first controller 120 and the second controller 160 are each realized by, for example, a hardware processor such as a central processing unit (CPU) executing a program (software). In addition, some or all of these components may be realized by hardware (a circuit unit; including circuitry) such as large scale integration (LSI), an application specific integrated circuit (ASIC), a field-programmable gate array (FPGA), or a graphics processing unit (GPU), or may be realized by software and hardware in cooperation. A program may be stored in advance in a storage device (a storage device having a non-transitory storage medium) such as an HDD or flash memory of the automated driving control device 100, or may be stored in a detachable storage medium such as a DVD or a CD-ROM and installed in the HDD or flash memory of the automated driving control device 100 by the storage medium (non-transitory storage medium) being attached to a drive device. The automated driving control device 100 or a configuration in which the automated driving control device 100 and the wiper control device 90 are combined is an example of a "vehicle control device," and a combination of the action plan generator 140 and the second controller 160 is an example of a "driving controller."

FIG. 2 is a functional configuration diagram of the first controller 120 and the second controller 160. The first controller 120 includes, for example, a recognizer 130, an action plan generator 140, and the mode determiner 150. The first controller 120 realizes, for example, a function by artificial intelligence (AI) and a function of a predetermined model in parallel. For example, a function of "recognizing an intersection" may be realized by executing both recognition of an intersection by deep learning and recognition based on a predetermined condition (a signal for pattern matching, a road sign, or the like) in parallel, and scoring and comprehensively evaluating both. As a result, reliability of automated driving is ensured.

The recognizer 130 recognizes states such as a position, a speed, and an acceleration of an object in the vicinity of the host vehicle M on the basis of the information input from the camera 10, the radar device 12, and the LIDAR 14 via the object recognition device 16. The position of an object is recognized as, for example, a position in absolute coordinates with a representative point (a center of gravity, a center of drive axis, or the like) of the host vehicle M set as the origin, and is used for control. The position of an object may be represented by a representative point such as the center of gravity or a corner of the object, or may be represented by an area. The "state" of the object may include the acceleration or jerk of the object, or a "behavioral state" (for example, whether the vehicle is changing lanes or is about to change lanes).

In addition, the recognizer 130 recognizes, for example, a lane (a traveling lane) in which the host vehicle M is traveling. For example, the recognizer 130 compares a pattern of road marking lines obtained from the second map information 62 (for example, an arrangement of solid lines and broken lines) and a pattern of road marking lines in the vicinity of the host vehicle M recognized from an image captured by the camera 10 to recognize the traveling lane. The recognizer 130 is not limited to road marking lines and may also recognize the traveling lane by recognizing a traveling road boundary (road boundary) including road marking lines, shoulders, curbs, medians, guardrails, and the like. In this recognition, the position of the host vehicle M acquired from the navigation device 50 and a result of processing by INS may be added. In addition, the recognizer 130 recognizes stop lines, obstacles, red lights, tollhouses, and other road events.

The recognizer 130 recognizes the position and posture of the host vehicle M with respect to the traveling lane when the traveling lane is recognized. The recognizer 130 may recognize, for example, a deviation of a reference point of the host vehicle M from the center of the lane and an angle formed against a line connecting the center of the lane in a traveling direction of the host vehicle M as a relative position and posture of the host vehicle M with respect to the traveling lane. Instead, the recognizer 130 may recognize the position of the reference point of the host vehicle M with respect to any side end (road marking lines or road boundaries) of the traveling lane as the relative position of the host vehicle M with respect to the traveling lane.

In principle, the action plan generator 140 travels in a recommended lane determined by the recommended lane determiner 61, and furthermore, generates a target trajectory on which the host vehicle M will automatically travel (regardless of an operation of a driver) in the future to be able to respond to surrounding conditions of the host vehicle M. The target trajectory includes, for example, a speed element. For example, the target trajectory is expressed as a sequence of points (trajectory points) to be reached by the host vehicle M. The trajectory point is a point to be reached by the host vehicle M for each predetermined traveling distance (for example, about several [m]) along a road, and, separately, a target speed and a target acceleration for each predetermined sampling time (for example, several tenths of a [sec]) are generated as a part of the target trajectory. In addition, the trajectory point may be a position to be reached by the host vehicle M at a corresponding sampling time for each predetermined sampling time. In this case, information on the target speed and target acceleration is expressed by an interval between trajectory points.

The action plan generator 140 may set an event of automated driving when a target trajectory is generated. The event of automated driving includes a constant-speed traveling event, a low-speed following traveling event, a lane change event, a branching event, a merging event, a takeover event, and the like. The action plan generator 140 generates a target trajectory according to an event to be started.

The mode determiner 150 determines the driving mode of the host vehicle M to be one of a plurality of driving modes in which tasks imposed on the driver are different. The mode determiner 150 includes, for example, a driver state determiner 152 and a mode change processor 154. These individual functions will be described below.

FIG. 3 is a diagram which shows an example of a corresponding relationship between a driving mode, a control state of the host vehicle M, and a task. The driving mode of the host vehicle M includes, for example, five modes from a mode A to a mode E. The control state, that is, a degree of automation of a driving control of the host vehicle M, is the highest in the mode A, then decreases in order of a mode B, a mode C, and a mode D, and the mode E is the lowest. On the contrary, the task imposed on the driver is the lightest in the mode A, then increases in order of the mode B, the mode C, and the mode D, and the mode E is the heaviest. In the modes D and E, the control state is not automated driving, so that the automated driving control device 100 is responsible for ending control related to automated driving and shifting to driving support or manual driving. Contents of each driving mode will be exemplified below.

In the mode A, the driver is in an automated driving state, and neither forward monitoring nor gripping of the steering wheel 82 (steering gripping in FIG. 3) is imposed on the driver. However, even in the mode A, the driver is required to be in a posture to quickly shift to manual driving in response to a request from the system mainly using the automated driving control device 100. The "automated driving" as used herein means that both steering and acceleration or deceleration are controlled without depending on an operation of the driver. The front means a space in a traveling direction of the host vehicle M that is visually recognized through the front windshield. The mode A is a driving mode which can be executed when conditions such as, for example, the host vehicle M is traveling on a motorway such as an expressway at a predetermined speed (for example, about 50 [km/h]) or less, and a presence of a preceding vehicle to be followed is satisfied, and may be called Traffic Jam Pilot (TJP). When this condition is not satisfied, the mode determiner 150 changes the driving mode of the host vehicle M to the mode B.

In mode B, the driver is in a driving support state, and the driver is tasked with monitoring the front of the host vehicle M (hereinafter referred to as forward monitoring), but is not tasked with gripping the steering wheel 82. In mode C, the driver is in a driving support state, and the driver is tasked with a forward monitoring task and a task of grasping the steering wheel 82. Mode D is a driving mode that requires a certain amount of driving operation by the driver for at least one of steering and acceleration or deceleration of the host vehicle M. For example, in mode D, driving support such as ACC (Adaptive Cruise Control) and LKAS (Lane Keeping Assist System) is provided. In mode E, both steering and acceleration or deceleration are in a state of manual operation that requires driving operation by the driver. In both mode D and mode E, the driver is naturally tasked with monitoring the front of the vehicle M. In each mode, peripheral monitoring may be imposed instead of forward monitoring. The peripheral means the space around the host vehicle M that the driver sees during manual driving. In the following description, it is assumed that "forward monitoring" is imposed The automated driving control device 100 (and the driving support device (not shown)) executes an automatic lane change according to the driving mode. The automatic lane change includes an automatic lane change (1) according to a system request and an automatic lane change (2) according to a driver's request. The automatic lane change (1) includes an automatic lane change for overtaking, which is performed when a speed of the preceding vehicle is smaller than a speed of the host vehicle by a reference or more, and an automatic lane change for traveling toward a destination (an automatic lane change by a change in recommended lane). When conditions related to speed and positional relationship with surrounding vehicles are satisfied, and when a direction indicator is operated by the driver, the automatic lane change (2) includes a change in lane of the host vehicle M toward the operation direction.

The automated driving control device 100 does not execute either the automatic lane change (1) or (2) in the mode A. The automated driving control device 100 executes both the automatic lane changes (1) and (2) in the modes B and C. The driving support device (not shown) does not execute the automatic lane change (1) but executes the automatic lane change (2) in the mode D. In the mode E, neither the automatic lane change (1) nor (2) is executed.

The mode determiner 150 changes the driving mode of the host vehicle M to a driving mode in which the task is heavier when the task related to the determined driving mode (hereinafter, a current driving mode) is not executed by the driver.

For example, in the mode A, when the driver is in a posture where he or she cannot shift to manual driving in response to a request from the system (for example, when he or she continues to look aside outside a permissible area or when a sign of difficulty in driving is detected), the mode determiner 150 performs control such as, by using the HMI 30, urging the driver to shift to the manual driving, causing the host vehicle M to move to a road shoulder and to gradually stop if the driver does not respond, and stops the automated driving. After the automated driving is stopped, the host vehicle is in the mode D or E, and the host vehicle M can be started by a manual operation of the driver. The same applies to "stopping the automated driving" below. When the driver is not monitoring forward in the mode B, the mode determiner 150 performs control such as, by using the HMI 30, urging the driver to monitor forward, causing the host vehicle M to move to the road shoulder and to gradually stop if the driver does not respond, and stopping the automated driving. When the driver is not monitoring forward in the mode C, or is not gripping the steering wheel 82, the mode determiner 150 performs control such as, by using the HMI 30, urging the driver to monitor forward and/or to grip the steering wheel 82, causing the host vehicle M to move to the road shoulder and to gradually stop if the driver does not respond, and stopping the automated driving.

The driver state determiner 152 monitors a state of the driver for the mode change described above, and determines whether the state of the driver is in a state corresponding to a task. For example, the driver state determiner 152 analyzes an image captured by the driver monitor camera 70 to perform posture estimation processing, and determines whether the driver is in a posture where he or she cannot shift to the manual driving in response to a request from the system. In addition, the driver state determiner 152 analyzes the image captured by the driver monitor camera 70 and performs line-of-sight estimation processing to determine whether the driver is monitoring forward.

The mode change processor 154 performs various types of processing for mode change. For example, the mode change processor 154 instructs the action plan generator 140 to generate a target trajectory for stopping at the road shoulder, gives an operation instruction to the driving support device (not shown), or performs control of the HMI 30 for urging for an action of the driver.

The mode change processor 154 changes a predetermined driving mode to another driving mode (for example, the mode E), for example, when the host vehicle M is controlled in the predetermined driving mode (for example, a mode of any one of the modes A to D) and when performance of the recognizer 130 to recognize a periphery of the host vehicle M has lowered by a predetermined degree or more. When the performance of the recognizer 130 to recognize a periphery of the host vehicle M has lowered by a predetermined degree or more is, for example, when the recognizer 130 cannot recognize or identify a road marking line, other vehicles, or other objects to the extent that the reference is satisfied. For example, when it rains heavily outside the vehicle and the camera 10 provided inside the vehicle cannot clearly capture an image the situation outside the vehicle, the performance of the recognizer 130 to recognize the periphery of the host vehicle M may lower by a predetermined degree or more as described above.

The mode change processor 154 changes the driving mode to a first driving mode on the basis of the operating state of the wiper 98 mounted on the host vehicle M when the automated driving control device 100 controls the host vehicle M in a second driving mode. The operating state of the wiper 98 mounted on the host vehicle M is an operating state according to the control of the wiper control device 90. More specifically, the mode change processor 154 determines whether to change the driving mode to the first driving mode in consideration of the operation mode of the wiper control device 90. In the following description, the operating state of the wiper 98 is described as, for example, a wiper that removes raindrops in the front window, but it may be one or both of wipers that remove raindrops in the rear window.

The second driving mode is, for example, a mode in which the task of monitoring forward and the task of gripping the steering wheel are not imposed on the driver, and the first driving mode is a mode (for example, the mode D, the mode E) in which a vehicle is controlled by a driving operation. The second driving mode is, for example, the mode A, and the first driving mode is, for example, the mode E. For example, the second driving mode may be a mode in which the task is lighter than that of the first driving mode, and the first driving mode may be a mode in which the task is heavier than the second driving mode.

The mode change processor 154 changes the driving mode from the second driving mode to the first driving mode, for example, when the operating state of the wiper 98 has satisfied a predetermined condition that there is estimated to be a predetermined degree or more of rainfall outside the vehicle. Having satisfied the predetermined condition that there is estimated to be a predetermined degree or more of rainfall outside the vehicle is, for example, when the wiper 98 is operating at a speed equal to or higher than a threshold value (for example, the amount of movement, an intermittent time, and the momentum equal to or less than the threshold value).

The second controller 160 controls the traveling drive force output device 200, the brake device 210, and the steering device 220 such that the host vehicle M passes through a target trajectory generated by the action plan generator 140 at a scheduled time.

Returning to FIG. 2, the second controller 160 includes, for example, an acquirer 162, a speed controller 164, and a steering controller 166. The acquirer 162 acquires information on a target trajectory (trajectory points) generated by the action plan generator 140 and stores it in a memory (not shown). The speed controller 164 controls the traveling drive force output device 200 or the brake device 210 based on a speed element associated with the target trajectory stored in the memory. The steering controller 166 controls the steering device 220 according to a degree of bending of the target trajectory stored in the memory. Processing of the speed controller 164 and the steering controller 166 is realized by, for example, a combination of feedforward control and feedback control. As an example, the steering controller 166 executes the combination of feedforward control according to a curvature of a road in front of the host vehicle M and feedback control based on a deviation from the target trajectory in combination.

The traveling drive force output device 200 outputs a traveling drive force (torque) for the vehicle to travel to the drive wheels. The traveling drive force output device 200 includes, for example, a combination of an internal combustion engine, a motor, a transmission, and the like, and an electronic control unit (ECU) that controls these. The ECU controls the configuration described above according to information input from the second controller 160 or information input from the driving operator 80.

The brake device 210 includes, for example, a brake caliper, a cylinder that transmits a hydraulic pressure to the brake caliper, an electric motor that generates a hydraulic pressure in the cylinder, and a brake ECU. The brake ECU controls the electric motor according to the information input from the second controller 160 or the information input from the driving operator 80 so that a brake torque according to a braking operation is output to each wheel. The brake device 210 may include a mechanism for transmitting a hydraulic pressure generated by an operation of a brake pedal included in the driving operator 80 to the cylinder via a master cylinder as a backup. The brake device 210 is not limited to the configuration described above, and may be an electronically controlled hydraulic brake device that controls an actuator according to the information input from the second controller 160 to transmit the hydraulic pressure of the master cylinder to the cylinder.

The steering device 220 includes, for example, a steering ECU and an electric motor. The electric motor changes, for example, a direction of a steering wheel by applying a force to a rack and pinion mechanism. The steering ECU drives the electric motor according to the information input from the second controller 160 or the information input from the driving operator 80, and changes the direction of the steering wheel.

[Control According to Operating State of Wiper]

Figure 4:
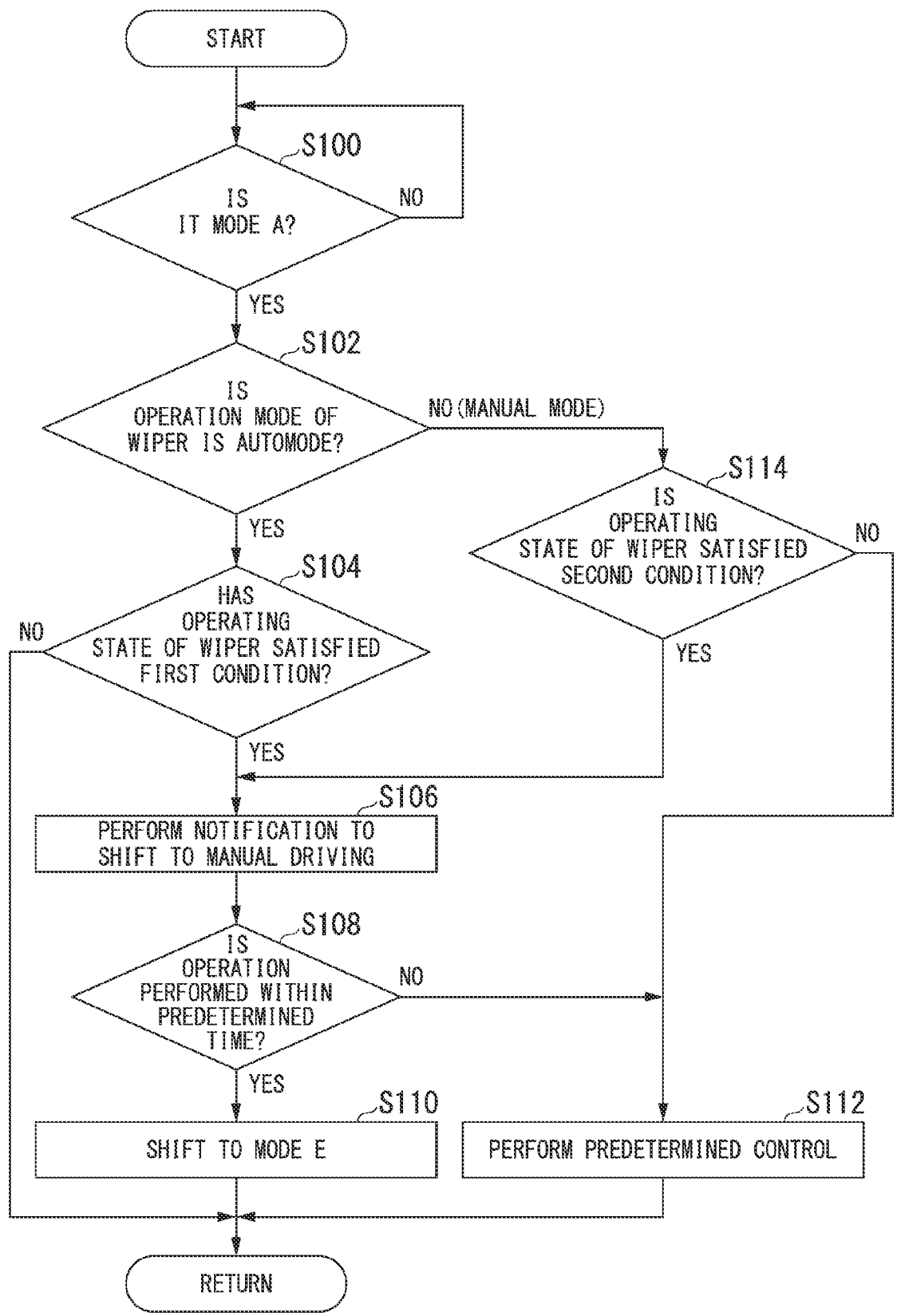
FIG. 4 is a flowchart which shows an example of a flow of processing executed by an automated driving control device 100.

FIG. 4 is a flowchart which shows an example of a flow of processing executed by the automated driving control device 100. First, the mode change processor 154 determines whether the driving mode is the mode A (step S100). When the driving mode is the mode A, the mode change processor 154 determines whether the operation mode of the wiper 98 is the auto mode (step S102). When the operation mode of the wiper 98 is the auto mode, the mode change processor 154 determines whether the operating state of the wiper 98 satisfies the first condition (step S104). The first condition will be described below.

When the operating state of the wiper 98 has satisfied the first condition, the mode change processor 154 controls the HMI 30 and notifies the driver that the operation shifts to the manual operation (step S106). Next, the mode change processor 154 determines whether the driver has performed a driving operation within a predetermined time (step S108). When the driver performs a driving operation within the predetermined time, the mode change processor 154 shifts the driving mode to the mode E (step S110).

If the driver does not perform a driving operation within the predetermined time, the mode change processor 154 performs predetermined control (step S112). The predetermined control includes, for example, control in which the driver is more strongly notified to perform a driving operation than in the notification in step S106, control in which the driving mode is changed to a driving mode heavier than the mode A, and control in which the driver is urged to perform a driving operation and to decelerate to stop the host vehicle M at a predetermined position. If a driving operation is performed during the predetermined control, the driving mode may be shifted to the mode E.

When the operation mode of the wiper 98 is not the auto mode (when it is the manual mode), the mode change processor 154 determines whether the operating state of the wiper 98 has satisfied the second condition (step S114). The second condition will be described below. When the operating state of the wiper 98 has satisfied the second condition, the processing proceeds to step S106, and, when the operating state of the wiper 98 has not satisfied the second condition, the processing proceeds to step S112. This completes the processing of one routine of this flowchart.

FIG. 5 is a diagram for describing the first condition and the second condition. The first condition is that the operation mode is the auto mode and a state in which the wiper 98 is operating at a high speed (a speed higher than a first speed) has continued for X seconds (for example, 10 seconds; a second time). The second condition is that the operation mode is the manual mode and a state in which the wiper 98 is operating at the high speed has continued for Y seconds (for example, 2 seconds; a third time). For example, the second condition is a condition of which the determination criterion is looser than the first condition. In the second condition, even if the operation speed of the wiper 98 is the same, since the time for continuing the operation at a high speed that satisfies the second condition is shorter than the time that satisfies the first condition, it can be said that the determination criterion of the second condition is looser than that of the first condition.

When the wiper 98 is operating in the auto mode, even if the rain sensor 94 is over-detected, the first condition is set to be stricter than the second condition, so that change of the driving mode due to this over-detection is suppressed. Since the manual mode controls the wiper 98 on the basis of an intention of the driver, when the wiper 98 is controlled at a high speed by the intention of the driver, the mode change processor 154 changes the driving mode if the second condition that is looser than the first condition is satisfied.

Note that the second condition may be set to be stricter than the first condition instead of the first condition being set to be stricter than the second condition. In this case, when the driver operates the wiper 98, for example, simply to look at an interesting landmark outside of the vehicle, it is easy to suppress a change of the driving mode.

In the example described above, it is determined whether the first condition is satisfied in the case of the mode A, but it may be determined whether the first condition is satisfied in the case of another driving mode. In addition, although it is assumed that the driving mode is shifted to the mode E in the step S106 to the step S110, the driving mode may also be shifted to other driving modes instead. The other driving modes are driving modes that are heavier than a driving mode in which it is determined whether the first condition is satisfied.

Moreover, when the first condition or the second condition is satisfied, the mode change processor 154 may, for example, give a notification to urge the driver to monitor forward, or give a notification to urge the driver to grip the steering wheel. After notification, the driving mode may be changed to another mode (for example, the mode E) if the driver monitors forward or grips the steering wheel and a certain condition is satisfied. The predetermined condition is, for example, that the wiper 98 has operated (or is operating) at a predetermined speed, or that a state in which the wiper 98 is operating at a predetermined speed has continued (is continuing) for a predetermined time. The driving mode may be changed to another mode when the driver does not monitor forward or grip the steering wheel within a predetermined time after the notification.

The first condition may be set according to a driving mode to be determined in step S100 described above. For example, as the driving mode in step S100 has a heavier task, the first condition or the second condition may be set to be a difficult condition (strict) to be satisfied. For example, the first condition when it is determined in step S100 whether the driving mode is the mode B may be a more difficult condition to be satisfied than the first condition when it is determined in step S100 whether the driving mode is the mode A. For example, the first condition when it is determined in step S100 whether the driving mode is the mode B may have a duration time longer than X seconds.

Similarly, the second condition may be set according to the driving mode to be determined in step S100. Also in this case, for example, the first condition when it is determined in step S100 whether the driving mode is the mode B may be a more difficult condition to be satisfied than the first condition when it is determined in step S100 whether the driving mode is the mode A. For example, the duration time may be set to a duration time longer than Y seconds.

One or both of the first condition and the second condition described above is an example in which the state in which the wiper 98 is operating at a speed equal to or higher than the first threshold value has continued for the first time.

The mode change processor 154 may change the driving mode to a driving mode with a heavier task when the wiper 98 does not operate even if the wiper control device 90 has given an instruction to cause the wiper 98 to operate. For example, when the wiper 98 does not operate even if the wiper control device 90 has given an instruction to cause the wiper 98 to operate, the wiper control device 90 transmits information indicating that the wiper 98 does not operate to the mode change processor 154. Then, the mode change processor 154 changes the driving mode to a driving mode with a heavy task on the basis of the information transmitted by the wiper control device 90.

As described above, the mode change processor 154 can control a vehicle more appropriately by changing the driving mode on the basis of the operating state of the wiper 98.

For example, when it rains heavily and the situation outside the vehicle cannot be recognized on the basis of an image taken by a camera installed in a vehicle compartment, or when recognition performance has deteriorated by more than a certain degree, automated driving will stop or the driving mode is changed to a driving mode with a heavier task. In this manner, when automated driving is stopped or the driving mode is changed in heavy rain, the driver may need to perform the driving operation when it is not ready for the driving operation, or it may be necessary to perform the driving operation in a situation where traffic conditions, road structures, and the like in the vicinity of the vehicle are not fully recognized. In the present embodiment, when there is a possibility that automated driving cannot be continued in the future, the automated driving control device 100 urges the driver to perform a driving operation or to change the driving mode before the situation outside the vehicle cannot be recognized on the basis of the image captured by the camera 10. As a result, the driver can perform the driving operation with a margin and can perform the driving operation while the situation outside the vehicle is reliably recognized, which is suitable for the driver.

Modified Example 1

Figure 6:
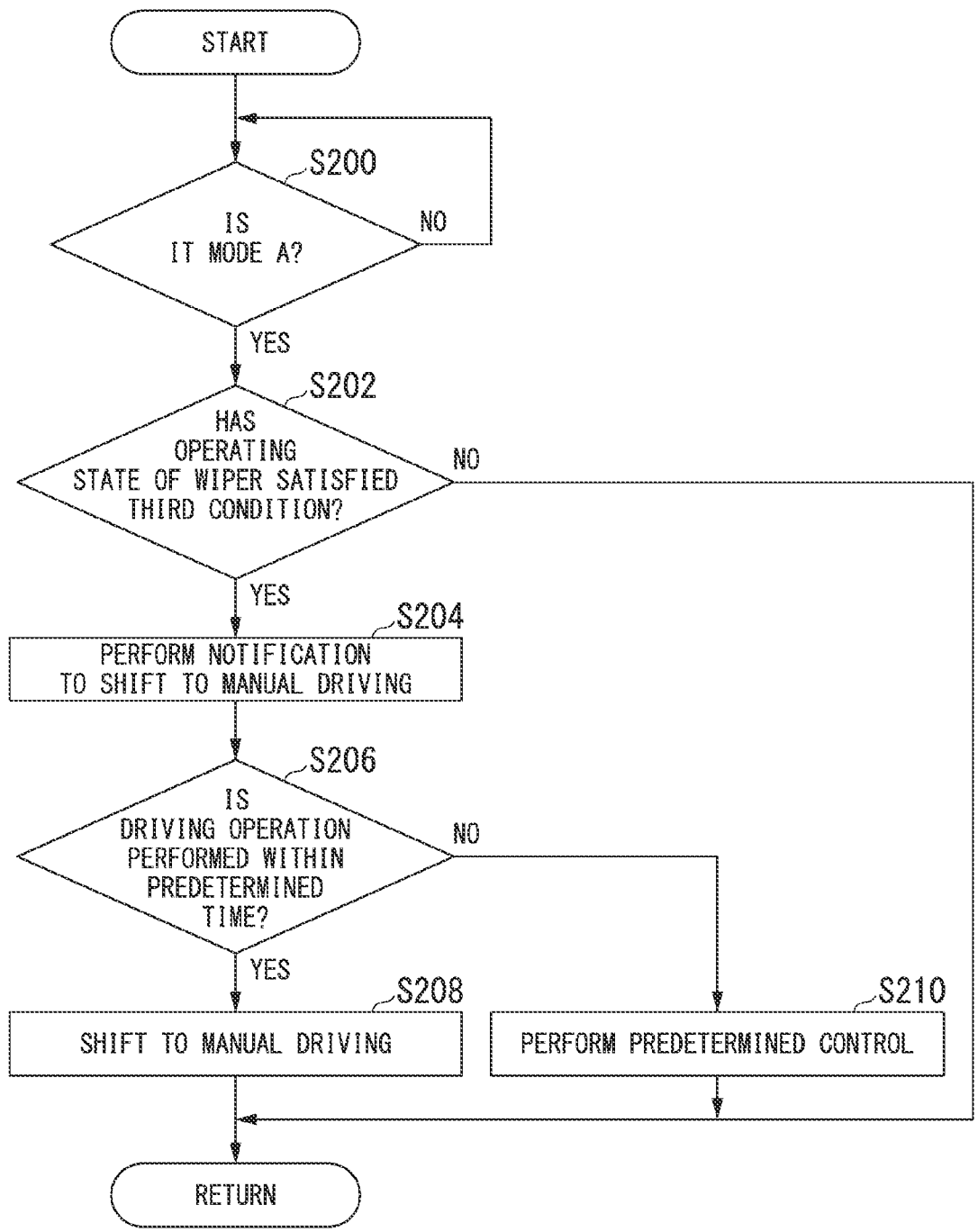
FIG. 6 is a flowchart which shows another example of the flow of the processing executed by the automated driving control device 100.

As shown in FIG. 6, the mode change processor 154 does not have to consider whether the operation mode is an auto mode or a manual mode. First, the mode change processor 154 determines whether the driving mode is the mode A (step S200). When the driving mode is the mode A, the mode change processor 154 determines whether the operating state of the wiper 98 has satisfied the third condition (step S202). When the operating state of the wiper 98 has not satisfied the third condition, one routine of this flowchart ends. The third condition is another example of the state in which the wiper 98 is operating at a speed equal to or higher than the first threshold value having continued for the first time.

When the operating state of the wiper 98 has satisfied the third condition, the mode change processor 154 executes the processing of steps S204 to S210. The processing of steps S204 to S210 are the same as the processing of steps S106 to S112, respectively.

According to the modified example, the mode change processor 154 can control the vehicle more easily and more appropriately.

<Other 1>

The first condition or the second condition may be the condition shown in FIG. 7. FIG. 7 is a diagram which shows another example of the first condition and the second condition. The first condition is, for example, that the operation mode is the auto mode and a state in which the wiper 98 is operating at a medium speed (a speed equal to or higher than the first speed) has continued for XX seconds (for example, 5 seconds; a second time), which means that it has occurred α times per unit time (at a predetermined traveling distance). The second condition is that the operation mode is the manual mode, and the state in which the wiper 98 is operating at the medium speed has continued for YY seconds (for example, 2 seconds; a third time), which means that it has occurred β times. For example, the second condition is a condition in which the determination criteria are looser than the first condition. For example, α times may be more than β times or may be the same.

When the conditions shown in FIG. 7 are applied, the following controls may be executed. For example, when the driving mode is the mode A and the first condition or the second condition shown in FIG. 7 is satisfied, the mode change processor 154 may perform, for example, a notification to urge the driver to monitor forward, or may also perform a notification to urge the driver to grip the steering wheel.

Moreover, in addition to the determination on the first condition or the second condition, information on the amount of rainfall at the position of the host vehicle M or an area in the traveling direction may be added. This rainfall information is transmitted by a server device that provides rainfall information or a vehicle in the vicinity by using communication. For example, the mode change processor 154 changes the driving mode to another driving mode when the first condition or the second condition is satisfied and the rainfall information has satisfied a predetermined reference. The first condition or the second condition may be a condition (loose condition) that is easier to be satisfied than the first condition or the second condition when the rainfall information is not added. The predetermined reference is that a state in which the wiper 98 of the host vehicle M operates at a high speed (or a predetermined speed) is expected to continue in the future. For example, it is raining at a predetermined degree or more in a predetermined area in the traveling direction of the host vehicle M.

In addition, when the host vehicle M has a function of detecting dirt on a lens of the camera 10, the first condition or the second condition may be set on the basis of a degree of dirt on the lens. As a method for detecting the dirt on the camera 10, various known methods can be used. For example, the mode change processor 154 may perform setting such that the first condition or the second condition is easier to be satisfied as the camera 10 has more dirt. For example, as the camera 10 has more dirt, the duration time may be set to be shorter. In this case, the mode change processor 154 can change the driving mode to an appropriate driving mode on the basis of an image captured by the camera 10 in a state where it is difficult to recognize the situation outside the vehicle.

<Other 2>

In the present embodiment, it is described that the mode change processor 154 changes the driving mode from the second driving mode to the first driving mode on the basis of the operating state of the wiper 98 mounted on the host vehicle M. In addition to (or instead of) this, when the vehicle M is controlled in the first driving mode (for example, any mode such as the mode E), it may be prohibited to change the driving mode from the first driving mode to the second driving mode (any mode among the modes A to D, which is a mode with a lighter task than that of the first driving mode) on the basis of the operating state of the wiper 98 mounted in the host vehicle M. For example, the mode change processor 154 prohibits changing the driving mode from the first driving mode to the second driving mode when a predetermined condition is satisfied. The predetermined condition is a condition used for determining whether the driving mode is changed from the second driving mode described above to the first driving mode. This condition is, for example, that the operating state of the wiper 98 is estimated to have a predetermined degree or more of rainfall, that the state in which the wiper 98 is operating at a speed equal to or higher than a predetermined degree or more is continuing for a predetermined time, and the first condition described above, the second condition described above, and the like. In addition, even when the wiper 98 does not operate, the change to the second driving mode may be prohibited.

The embodiments described above can be expressed as follows.

The vehicle control device includes a storage device that has stored a program, and a hardware processor, wherein the hardware processor executes the program, thereby controlling one or both of steering and acceleration or deceleration of a vehicle, determining a driving mode of the vehicle to be one of a plurality of driving modes including a first driving mode and a second driving mode, the second driving mode is a driving mode with a lighter task imposed on the driver than that of the first driving modem and in which one or both of the steering and the acceleration or deceleration are controlled, and the driving mode is changed to the first driving mode on the basis of an operating state of a wiper mounted in the vehicle when the vehicle is controlled in the second driving mode.

Although a mode for carrying out the present invention has been described above using the embodiment, the present invention is not limited to the embodiment, and various modifications and substitutions can be made within a range not departing from the gist of the present invention.

REFERENCE SIGNS LIST

10 Camera
12 Radar device
14 LIDAR
16 Object recognition device
70 Driver monitor camera
82 Steering wheel
84 Steering grip sensor
90 Wiper control device
92 Wiper drive unit
94 Rain sensor
96 Wiper switch
98 Wiper
100 Automated driving control device
130 Recognizer
140 Action plan generator
150 Mode determiner
152 Driver state determiner
154 Mode change processor

The invention claimed is:

1. A vehicle control device comprising:
a memory that stores instructions; and
one or more processors that execute the instructions to:
control one or both of steering and acceleration or deceleration of a vehicle;
determine a driving mode of the vehicle to be one of a plurality of driving mode including a first driving mode and a second driving mode, in which the second driving mode is a driving mode in which a degree of automation is higher than that of the first driving mode and one or both of the steering and the acceleration or deceleration are controlled without depending on an operation of the driver of the vehicle, and to change the driving mode to the first driving mode on the basis of an operation state of a wiper mounted on the vehicle when the vehicle is controlled in the second driving mode; and
control the wiper in a first mode in which the operating state of the wiper is controlled on the basis of rainfall information acquired from a detector that detects the amount of rainfall outside the vehicle, or in a second mode in which the operating state of the wiper is controlled on the basis of setting information acquired from a switch that is operated by the driver and receives the setting of the operating state of the wiper,
change the driving mode to the first driving mode when an operating state of the wiper is controlled in the first mode and the operating state of the wiper has satisfied a first condition, and
change the driving mode to the first driving mode when the operating state of the wiper is controlled in the second mode and the operating state of the wiper has satisfied a second condition that is different from the first condition,
wherein the second condition is a condition in which the time criterion is less than that of the first condition.

2. The vehicle control device according to claim 1,
wherein the second driving mode is a mode in which a task of monitoring surroundings of the vehicle and a task of gripping a steering wheel are not imposed on the driver, and
the first driving mode is a mode in which the vehicle is controlled by a driving operation of the driver.

3. The vehicle control device according to claim 1,
wherein the one or more processors that execute the instructions to: change the driving mode to the first driving mode when an operating state of the wiper has satisfied a predetermined condition where it is estimated to have a predetermined degree or more of rainfall.

4. The vehicle control device according to claim 1,
wherein the one or more processors that execute the instructions to: change the driving mode to the first driving mode when a state in which the wiper is operating at a speed equal to or higher than a first threshold value has continued for a first time.

5. The vehicle control device according to claim 1,
wherein the one or more processors that execute the instructions to: determine whether to maintain the second driving mode or to change the driving mode to the first driving mode on the basis of an operating state of the wiper when the vehicle is controlled in a second driving mode.

6. The vehicle control device according to claim 1,
wherein the first condition is that the wiper operates at a speed equal to or higher than a first speed for a second time, and
the second condition is that the wiper operates at a speed equal to or higher than the first speed for a third time shorter than the second time.

7. The vehicle control device according to claim 1,
wherein the one or more processors that execute the instructions to: change the driving mode to the first driving mode when the wiper does not operate even if an instruction to cause the wiper to operate has been given.

8. The vehicle control device according to claim 1,
wherein the one or more processors that execute the instructions to: prohibit to change the driving mode to the second driving mode on the basis of an operating state of a wiper mounted on the vehicle when the vehicle is controlled in the first driving mode.

9. The vehicle control device according to claim 8,
wherein the one or more processors that execute the instructions to: prohibit to change the driving mode to the second driving mode when the operating state of the wiper has satisfied a predetermined condition where it is estimated to have a predetermined degree or more of rainfall, or
prohibit to change the driving mode to the second driving mode when a state in which the wiper is operating at a speed equal to or higher than a predetermined degree is continuing for a predetermined period of time.

10. The vehicle control device according to claim 1,
wherein the one or more processors that execute the instructions to:
recognize a surrounding situation of the vehicle by using at least an image captured by a camera that captures an image of an outside of the vehicle mounted in a compartment of the vehicle,
wherein, when automated driving that automatically control one of both of the steering and the acceleration or deceleration on the basis of the surrounding situation is performed and performance to recognize surroundings of the vehicle deteriorates by a predetermined degree or more, stop the automated driving.

11. A vehicle control device comprising:
a memory that stores instructions; and
one or more processors that execute the instructions to:
control one or both of steering and acceleration or deceleration of a vehicle;
determine a driving mode of the vehicle to be one of a plurality of driving modes including a first driving mode and a second driving mode, in which the second driving mode is a driving mode in which a degree of automation is higher than that of the first driving mode and one or both of the steering and the acceleration or deceleration are controlled, and to change the driving mode to the first driving mode on the basis of an operation state of a wiper mounted on the vehicle when the vehicle is controlled in the second driving mode; and
control the wiper in a first mode in which the operating state of the wiper is controlled on the basis of a situation outside the vehicle, or in a second mode in which the operating state of the wiper is controlled on the basis of setting information acquired from a switch that is operated by the driver and receives the setting of the operating state of the wiper,
change the driving mode to the first driving mode when an operating state of the wiper is controlled in the first mode and the operating state of the wiper has satisfied a first condition, and
change the driving mode to the first driving mode when the operating state of the wiper is controlled in the second mode and the operating state of the wiper has satisfied a second condition that is different from the first condition,
wherein the second condition is a condition in which the time criterion is less than that of the first condition.

12. The vehicle control device according to claim 11,
wherein the first condition is that the wiper operates at a speed equal to or higher than a first speed for a second time, and
the second condition is that the wiper operates at a speed equal to or higher than the first speed for a third time shorter than the second time.

13. A vehicle system comprising:
a memory that stores instructions; and
one or more processors that execute the instructions to:
control one or both of steering and acceleration or deceleration of a vehicle;
determine a driving mode of the vehicle to be one of a plurality of driving modes including a first driving mode and a second driving mode, in which the second driving mode is a driving mode in which a degree of automation is higher than that of the first driving mode and one or both of the steering and the acceleration or deceleration are controlled by the driving controller, and to change the driving mode to the first driving mode on the basis of an operation state of a wiper mounted on the vehicle when the vehicle is in the second driving mode; and
control the wiper in a first mode in which the operating state of the wiper is controlled on the basis of rainfall information acquired from a detector that detects rainfall outside the vehicle, or in a second mode in which the operating state of the wiper is controlled on the basis of setting information acquired from a switch that is operated by the driver and receives the setting of the operating state of the wiper,
wherein the driving mode is changed to the first driving mode in response to an operating state of the wiper being in the first mode and the operating state of the wiper has satisfied a first condition, and change the driving mode to the first driving mode in response to the operating state of the wiper being in the second mode and the operating state of the wiper has satisfied a second condition that is different from the first condition, wherein the second condition is a condition in which the time criterion is less than that of the first condition.

14. The vehicle control device according to claim 13,
wherein the first condition is that the wiper operates at a speed equal to or higher than a first speed for a second time, and the second condition is that the wiper operates at a speed equal to or higher than the first speed for a third time shorter than the second time.

* * * * *